(12) United States Patent
Lee

(10) Patent No.: US 11,332,130 B2
(45) Date of Patent: May 17, 2022

(54) COLLISION AVOIDANCE CONTROL METHOD AND APPARATUS FOR VEHICLE

(71) Applicant: HYUNDAI MOBIS Co., Ltd., Seoul (KR)

(72) Inventor: Hyung Myung Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 97 days.

(21) Appl. No.: 16/844,490

(22) Filed: Apr. 9, 2020

(65) Prior Publication Data
US 2020/0324760 A1   Oct. 15, 2020

(30) Foreign Application Priority Data

Apr. 11, 2019 (KR) .......................... 10-2019-0042490

(51) Int. Cl.
*B60W 30/09* (2012.01)
*B60W 30/095* (2012.01)
*B60W 30/18* (2012.01)

(52) U.S. Cl.
CPC ........ *B60W 30/09* (2013.01); *B60W 30/0956* (2013.01); *B60W 30/18027* (2013.01);
(Continued)

(58) Field of Classification Search
CPC ............. B60W 30/09; B60W 30/0956; B60W 30/18163; B60W 30/18027; B60W 2720/106; B60W 2554/4041; B60W 2554/4042; B60W 2710/20; B60W 2420/52; B60W 2420/42; B60W 2554/802; B60W 2554/806; B60W 2554/804; B60W 30/08; B60W 50/14; B60W 40/107; B60W 40/105; B60W 2520/105; B60W 2554/801; B60W 2720/10; B60Y 2300/08; B60Y 2300/18166; B60Y 2302/03
See application file for complete search history.

(56) References Cited

U.S. PATENT DOCUMENTS

2019/0193726 A1*   6/2019   Ishikawa ............... B60W 30/09

FOREIGN PATENT DOCUMENTS

KR   2015-0071568   6/2015
KR   20160091040 A * 8/2016

OTHER PUBLICATIONS

English_Translation_KR20160091040A (Year: 2016).*

\* cited by examiner

*Primary Examiner* — Peter D Nolan
*Assistant Examiner* — Ashley L Redhead, Jr.
(74) *Attorney, Agent, or Firm* — H.C. Park & Associates, PLC

(57) ABSTRACT

A collision avoidance control method for a vehicle, through which a collision avoidance control apparatus controls a vehicle to avoid a collision. The collision avoidance control method includes: calculating a TTC (Time To Collision) between the vehicle and a rearward vehicle, when the rearward vehicle approaching the rear of the vehicle is sensed; determining whether the vehicle and the rearward vehicle are likely to collide with each other, by comparing the TTC to a preset reference TTC; and performing a collision avoidance function when it is determined that the vehicle and the rearward vehicle are likely to collide with each other, the collision avoidance function including one or more of a collision risk warning signal output function, a forward acceleration control function and a lane change control function.

12 Claims, 6 Drawing Sheets

(52) U.S. Cl.
CPC ............... *B60W 30/18163* (2013.01); *B60W 2554/4041* (2020.02); *B60W 2554/4042* (2020.02); *B60W 2710/20* (2013.01); *B60W 2720/106* (2013.01)

COLLISION AVOIDANCE CONTROL METHOD AND APPARATUS FOR VEHICLE

CROSS-REFERENCE TO RELATED APPLICATION

This application claims priority from and the benefit of Korean Patent Application No. 10-2019-0042490, filed on Apr. 11, 2019, which is hereby incorporated by reference for all purposes as if set forth herein.

BACKGROUND

Field

Exemplary embodiments of the present disclosure relate to a collision avoidance control method and apparatus for a vehicle, and more particularly, to a collision avoidance control method and apparatus for a vehicle, which can perform a collision avoidance function such as a warning signal output function, a forward acceleration control function or a lane change control function, when a vehicle is likely to collide with a rearward vehicle which is approaching the rear of the vehicle.

Discussion of the Background

The AEBS (Autonomous Emergency Braking System) mounted in a vehicle refers to a system which applies the brakes of a vehicle in an emergency to prevent a collision or accident.

The AEBS includes a camera and a radar. When an object is recognized ahead of a vehicle in operation, the AEBS measures the distance from the object and the relative speed of the object, and determines a risk of collision with the object. Then, the AEBS operates a brake device to avoid a collision, when there is the risk of collision.

However, since the conventional AEBS performs emergency braking by considering only an object located ahead of the vehicle, the conventional AEBS cannot prevent an accident caused by a rear end collision, when another vehicle is located at the rear of the vehicle.

Thus, there is a demand for the development of technology which can prevent an accident caused by a rear end collision in case of emergency braking, even when there is a rearward vehicle which is approaching the rear of the vehicle.

The related art of the present disclosure is disclosed in Korean Patent Application No. 2015-0071568 entitled "Autonomous Emergency Braking Method and System").

The above information disclosed in this Background section is only for enhancement of understanding of the background of the invention and, therefore, it may contain information that does not constitute prior art.

SUMMARY

Exemplary embodiments of the present invention are directed to a collision avoidance control method and apparatus for a vehicle, which can avoid a collision with a rearward vehicle which is approaching the rear of a vehicle, in case of emergency braking of the vehicle.

Additional features of the invention will be set forth in the description which follows and, in part, will be apparent from the description, or may be learned by practice of the invention.

In an embodiment, there is provided a collision avoidance control method for a vehicle, through which a collision avoidance control apparatus controls a vehicle to avoid a collision. The collision avoidance control method may include: calculating a TTC (Time To Collision) between the vehicle and a rearward vehicle, when the rearward vehicle approaching the rear of the vehicle is sensed; determining whether the vehicle and the rearward vehicle are likely to collide with each other, by comparing the TTC to a preset reference TTC; and performing a collision avoidance function when it is determined that the vehicle and the rearward vehicle are likely to collide with each other, the collision avoidance function including one or more of a collision risk warning signal output function, a forward acceleration control function and a lane change control function.

The TTC may be calculated based on a distance between the vehicle and the rearward vehicle and a speed difference between the vehicle and the rearward vehicle.

The TTC may include a first reference TTC for determining whether to output a collision risk warning signal and a second reference TTC for determining whether to perform the collision avoidance control function. The determining of whether the vehicle and the rearward vehicle are likely to collide with each other may include: determining whether the TTC is less than the first reference TTC; controlling the vehicle to normally travel when the TTC is not less than the first reference TTC, and determining whether the TTC is less than the second reference TTC, when the TTC is less than the first reference TTC; and outputting a warning risk warning signal when the TTC is not less than the second reference TTC, and determining that the vehicle and the rearward vehicle are likely to collide with each other, when the TTC is less than the second reference TTC.

The performing of the collision avoidance function may include: determining whether a forward acceleration zone is securable, based on information on a forward vehicle which is traveling ahead of the vehicle; performing the forward acceleration control function for controlling the vehicle to move to the forward acceleration zone, when the forward acceleration zone is secured, and determining whether a lane change zone is securable, based on the TTC and information on a side vehicle which is traveling on a left or right lane of the vehicle, when the forward acceleration zone is not securable; and performing the lane change control function for controlling the vehicle to move to the lane change zone, when the lane change zone is securable.

The lane change zone may have a variable size which is set based on the TTC.

The collision avoidance control method may further include calculating a rearward impact amount with the rearward vehicle and a forward impact amount with the forward vehicle, when the lane change zone is not securable, and deciding the speed of the vehicle, at which any one of the rearward impact amount and the forward impact amount is minimized, and controlling the vehicle to travel at the decided speed.

In an embodiment, a collision avoidance control apparatus for a vehicle may include: a sensor unit configured to sense a rearward vehicle which is approaching the rear of a vehicle; a collision likelihood determination unit configured to calculate a TTC between the vehicle and the rearward vehicle, when the rearward vehicle is sensed through the sensor unit, compare the TTC to a preset reference TTC, and determine whether the vehicle and the rearward vehicle are likely to collide with each other; and a collision avoidance processing unit configured to perform a collision avoidance function when it is determined that the vehicle and the rearward vehicle are likely to collide with each other, the collision avoidance function including one or more of a collision risk warning signal output function, a forward acceleration control function and a lane change control function.

The collision likelihood determination unit may calculate the TTC based on a distance between the vehicle and the rearward vehicle and a speed difference between the vehicle and the rearward vehicle.

The TTC may include a first reference TTC for determining whether to output a collision risk warning signal and a second reference TTC for determining whether to perform the collision avoidance control function. The collision likelihood determination unit may compare the TTC to the first reference TTC, control the vehicle to normally travel when the TTC is not less than the first reference TTC, compare the TTC to the second reference TTC when the TTC is less than the first reference TTC, output a collision risk warning signal when the determination result indicates that the TTC is not less than the second reference TTC, and determine that the vehicle and the rearward vehicle are likely to collide with each other, when the determination result indicates the TTC is less than the second reference TTC.

The collision avoidance processing unit may perform the forward acceleration control function for controlling the vehicle to move to a forward acceleration zone, when the forward acceleration zone is securable based on information on a forward vehicle which is traveling ahead of the vehicle.

The collision avoidance processing unit may perform the lane change control function for controlling the vehicle to move to a lane change zone, when the lane change zone is securable based on the TTC and information on a side vehicle which is traveling on a left or right lane of the vehicle.

The lane change zone may have a variable size which is set based on the TTC.

The collision avoidance processing unit may calculate a rearward impact amount with the rearward vehicle and a forward impact amount with the forward vehicle when the vehicle cannot avoid a collision with the rearward vehicle, and decide the speed of the vehicle, at which any one of the rearward impact amount and the forward impact amount is minimized, and control the vehicle to travel at the decided speed.

In accordance with the embodiments of the present disclosure, the collision avoidance control method and apparatus for a vehicle in accordance with the embodiments of the present disclosure may perform the collision avoidance function such as the warning signal output function, the forward acceleration control function or the lane change control function, when the ego vehicle is likely to collide with the rearward vehicle approaching the rear of the ego vehicle, thereby preventing a rear end collision accident caused by emergency braking. In particular, when the rearward vehicle is a truck/bus on a general road or highway, the collision avoidance control method and apparatus can reduce an accident probability through the warning signal output function, the forward acceleration control function and the lane change control function of the ego vehicle.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
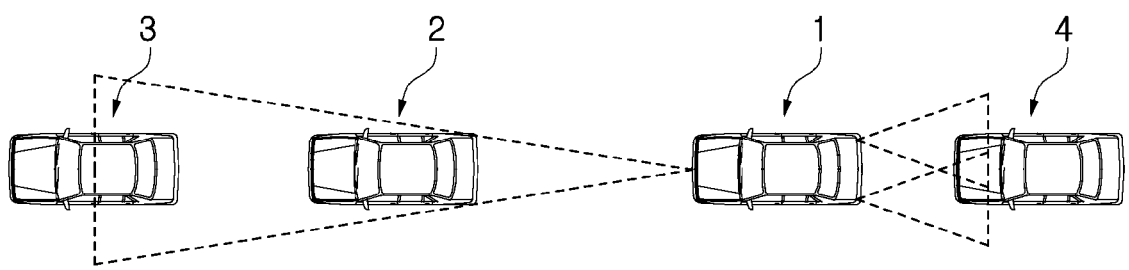
FIG. 1 is a diagram illustrating an example to which a collision avoidance control apparatus for a vehicle in accordance with an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a collision avoidance control method and apparatus for a vehicle will be described below with reference to the accompanying drawings through various examples of embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Furthermore, the embodiments described in this specification may be implemented with a method or process, a device, a software program, a data stream or a signal, for example. Although the embodiments have been discussed in a single form of implementation (for example, only in a method), the features of the discussed embodiments can be implemented in other forms (for example, device or program). The device can be implemented in proper hardware, software, firmware and the like. The method can be implemented in a device such as a processor which generally refers to a processing device including a computer, a microprocessor, an integrated circuit or a programmable logic device. The processor includes a communication device such as a computer, a cell phone, a personal digital assistant (PDA) and another device, which can facilitate communication of information between an end user and the processor.

FIG. 1 is a diagram illustrating an example to which a collision avoidance control apparatus for a vehicle in accordance with an embodiment of the present disclosure is applied.

Referring to FIG. 1, the collision avoidance control apparatus in accordance with the embodiment of the present disclosure may be installed in an ego vehicle 1, and sense a forward vehicle 2 which travels ahead of the ego vehicle 1, a rearward vehicle 4 which approaches the rear of the ego vehicle 1, and a side vehicle (not illustrated) which travels on a side of the ego vehicle.

At this time, during driving of the ego vehicle 1, the collision avoidance control apparatus analyzes whether the ego vehicle 1 is likely to collide with the rearward vehicle 4, and performs a collision avoidance function such as a warning signal output function, a forward acceleration control function or a lane change control function, when the ego vehicle is likely to collide with the rearward vehicle 4. That is, when determining that the likelihood of collision with the rearward vehicle 4 is low, the collision avoidance control apparatus outputs a warning signal, and provides a driver of the ego vehicle 1 with a margin of response time required for avoiding a collision. Furthermore, when determining that the likelihood of collision with the rearward vehicle 4 is high, the collision avoidance control apparatus performs a collision avoidance function such as a forward acceleration control function or a lane change control function.

Through such a collision avoidance control apparatus, the ego vehicle 1 can perform emergency braking even when the rearward vehicle 4 traveling just behind the ego vehicle 1 is present, thereby preventing a collision accident between the ego vehicle 1 and the rearward vehicle 4.

Figure 2:
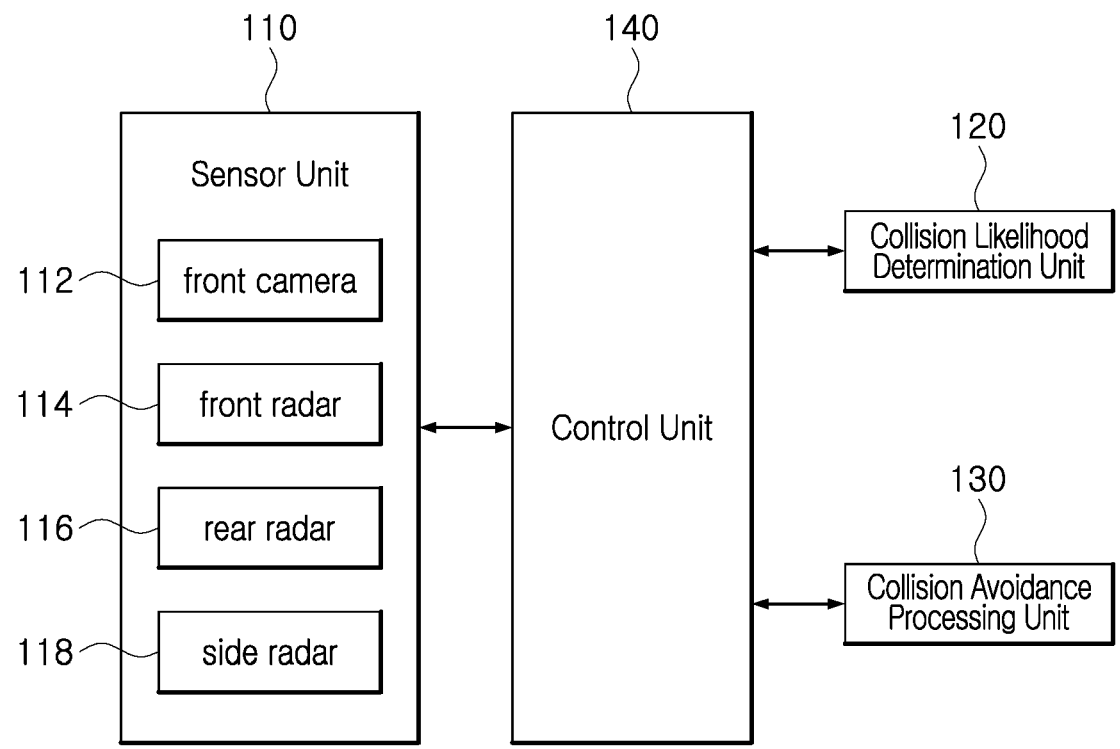
FIG. 2 is a block diagram for describing the collision avoidance control apparatus for a vehicle in accordance with the exemplary embodiment of the present invention.
Figure 3:
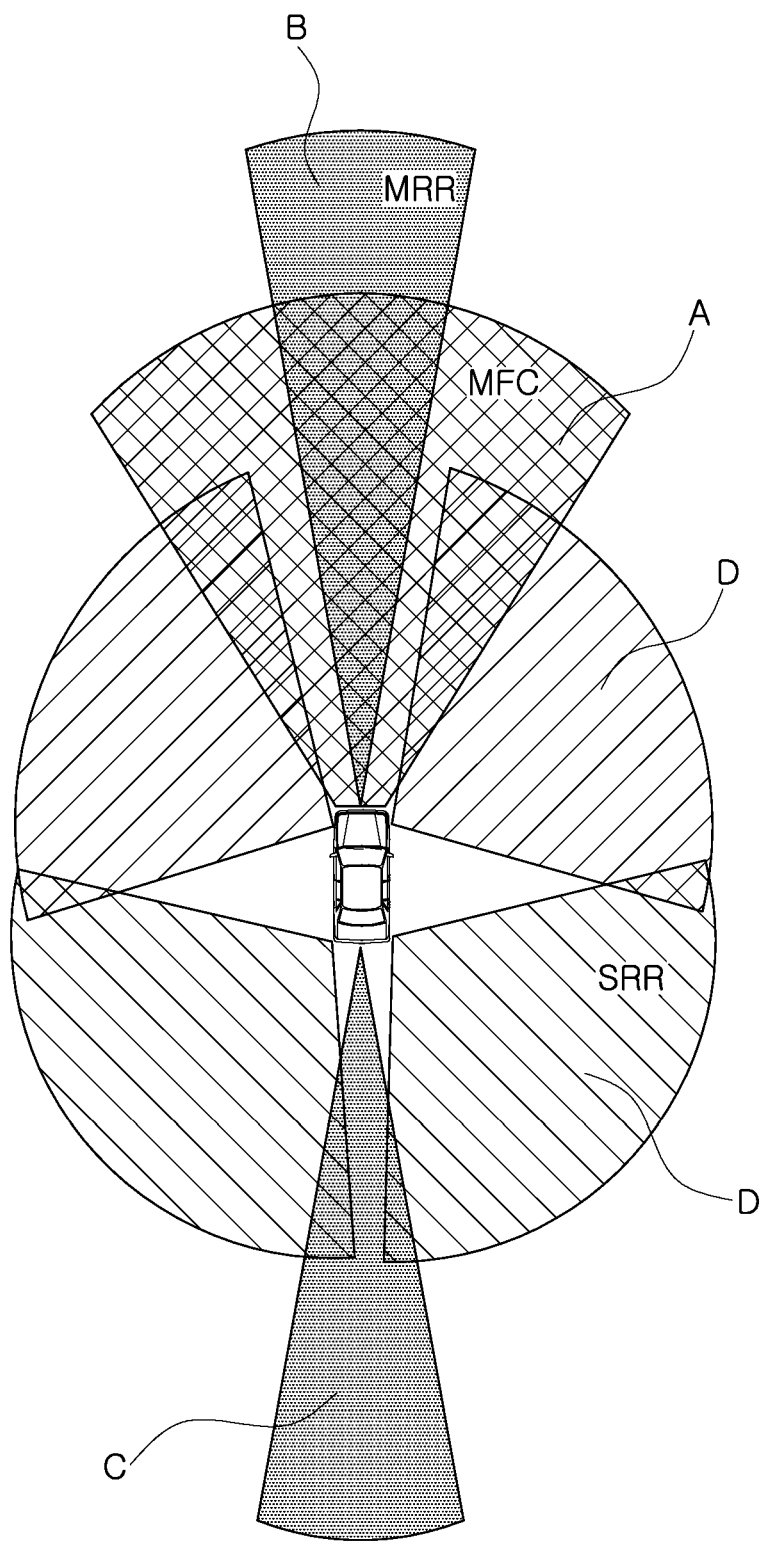
FIG. 3 is a diagram for describing an operation of a sensor unit in accordance with the exemplary embodiment of the present invention.
Figure 4:
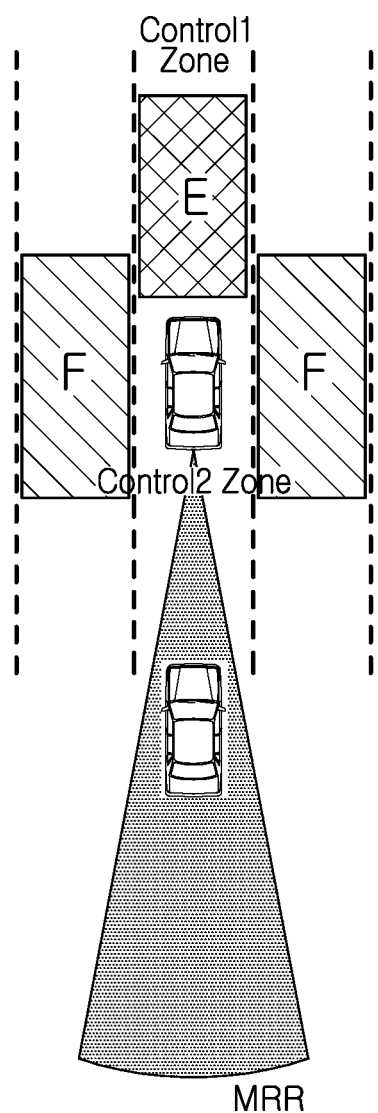
FIG. 4 is a diagram for describing a forward acceleration zone and a lane change zone in accordance with the exemplary embodiment of the present invention.
Figure 5:
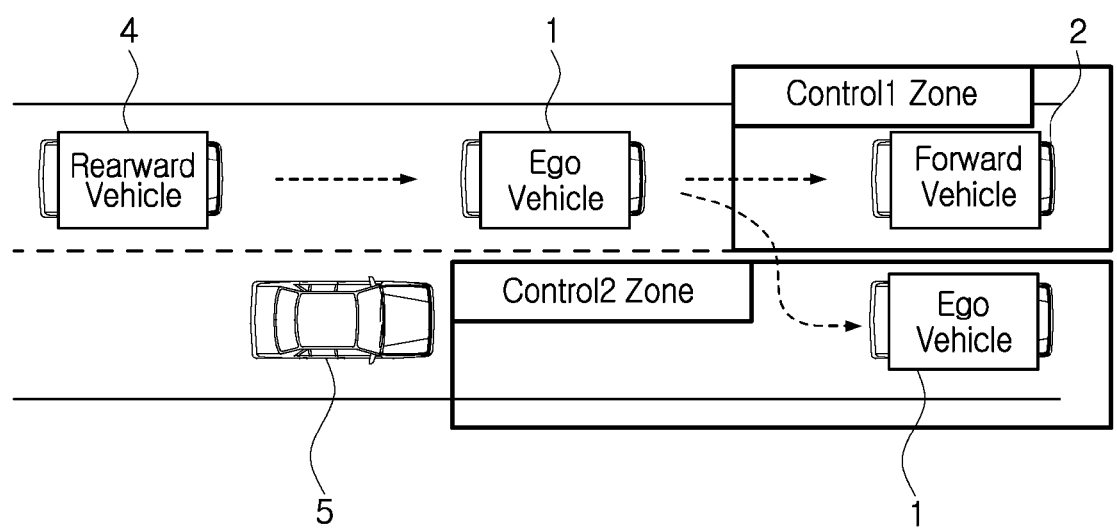
FIG. 5 is a diagram for describing a lane change control function in accordance with the exemplary embodiment of the present invention.

FIG. 2 is a block diagram for describing the collision avoidance control apparatus for a vehicle in accordance with the embodiment of the present disclosure, FIG. 3 is a diagram for describing an operation of a sensor unit in accordance with the embodiment of the present disclosure, FIG. 4 is a diagram for describing a forward acceleration zone and a lane change zone in accordance with the embodiment of the present disclosure, and FIG. 5 is a diagram for describing the lane change control function in accordance with the embodiment of the present invention.

Referring to FIG. 2, the collision avoidance control apparatus 100 in accordance with the embodiment of the present disclosure includes a sensor unit 110, a collision likelihood determination unit 120, a collision avoidance processing unit 130 and a control unit 140.

The sensor unit 110 senses the forward area, rearward area and side areas of the ego vehicle, and provides the sensing results to the control unit 140. The sensor unit 110 may include a front camera 112, a front radar 114, a rear radar 116 and a side radar 118, and sense areas illustrated in FIG. 3. Specifically, the front camera 112 and the front radar 114 may monitor the forward area of the ego vehicle, and the rear radar 116 and the side radar 118 may monitor the rearward area and the side areas of the ego vehicle. For example, the front camera 112 may sense an area A, the front radar 114 may sense an area B, the rear radar 116 may sense an area C, and the front, rear and side radars 114, 116 and 118 may sense all areas around the vehicle as indicated by D.

The front radar 114, the rear radar 116 and the side radar 118 may transmit laser signals to the forward area, rearward area and side areas of the ego vehicle, receive laser signals reflected from a forward vehicle, a rearward vehicle and a side vehicle, and output forward vehicle information, rearward vehicle information and side vehicle information. The forward vehicle information may include the speed of the forward vehicle and the distance from the forward vehicle, the rearward vehicle information may include the speed of the rearward vehicle and the distance from the rearward vehicle, and the side vehicle information may include the speed of the side vehicle and the distance from the side vehicle.

When a rearward vehicle is sensed through the sensor unit 110, the collision likelihood determination unit 120 calculates a TTC (Time To Collision) between the ego vehicle and the rearward vehicle, compares the TTC to a preset reference TTC, and determines whether the ego vehicle is likely to collide with the rearward vehicle, based on the comparison result. The reference TTC may include a first reference TTC and a second reference TTC. The first reference TTC may be used as a reference TTC for determining whether the rearward vehicle is located in a warning zone where a warning signal is outputted in advance to inform a driver of the ego vehicle of a dangerous situation, even though the collision likelihood between the ego vehicle and the rearward vehicle is not high. The second reference TTC may be used as a reference TTC for determining whether the rearward vehicle is located in a control zone where the collision avoidance control function is performed, because the collision likelihood between the ego vehicle and the rearward vehicle is high.

The collision likelihood determination unit 120 calculates the TTC using the ego vehicle information and the rearward vehicle information sensed through the sensor unit 110, when the rearward vehicle is sensed. At this time, the collision likelihood determination unit 120 may calculate the TTC through Equation 1 below, which uses a speed difference between the ego vehicle and the rearward vehicle and a distance between the ego vehicle and the rearward vehicle.

$$TTC = \frac{X_{rel}}{V_{rel}} \quad \text{[Equation 1]}$$

In Equation 1, $X_{rel}$ represents the distance between the ego vehicle and the rearward vehicle, and $V_{rel}$ represents the speed difference between the ego vehicle and the rearward vehicle.

The collision likelihood determination unit 120 may also calculate the TTC between the ego vehicle and the rearward vehicle, based on the speed of the ego vehicle, the speed of the rearward vehicle, the acceleration/deceleration of the ego vehicle, the acceleration/deceleration of the rearward vehicle, and the distance between the ego vehicle and the rearward vehicle.

When the TTC is calculated through Equation 1, the collision likelihood determination unit 120 compares the TTC to the first reference TTC for determining the warning zone, and outputs a collision risk warning signal based on the comparison result. The collision likelihood determination unit 120 compares the TTC to the second reference TTC for determining the control zone, and determines whether the ego vehicle and the rearward vehicle are likely to collide with each other, based on the comparison result.

That is, the collision likelihood determination unit 120 determines whether the TTC is less than the first reference TTC. When the determination result indicates that the TTC is not less than the first reference TTC, the collision likelihood determination unit 120 does not output the warning signal, but controls the ego vehicle to normally travel, because the collision likelihood is low even though the rearward vehicle was sensed.

When the TTC is less than the first reference TTC, the collision likelihood determination unit 120 determines whether the TTC is less than the second reference TTC. When the determination result indicates that the TTC is not less than the second reference TTC, the collision likelihood determination unit 120 outputs a collision risk warning signal to inform the driver of the dangerous situation. The warning signal may be a prior warning for the driver of the ego vehicle and the driver of the rearward vehicle. Specifically, a warning message may be outputted as a sound signal to the driver of the ego vehicle, and a warning message may be outputted as an emergency light signal to the driver of the rearward vehicle.

When the TTC is less than the second reference TTC, the collision likelihood determination unit 120 determines that the ego vehicle and the rearward vehicle are likely to collide with each other.

When the collision likelihood determination unit 120 determines that the ego vehicle and the rearward vehicle are likely to collide with each other, the collision avoidance processing unit 130 performs the collision avoidance function such as the forward acceleration control function or the lane change control function, and controls the ego vehicle to exit from a dangerous situation caused by a rear end collision. At this time, as illustrated in FIG. 4, the forward acceleration control function requires a forward acceleration zone E serving as a space where the ego vehicle can move forward, and the lane change control function requires a lane change zone F serving as a space where the ego vehicle can move to another lane.

The collision avoidance processing unit 130 determines whether the forward acceleration zone can be secured, based on information on the forward vehicle which is traveling ahead of the ego vehicle, and performs the forward acceleration control function for controlling the ego vehicle to move to the forward acceleration zone, when the forward acceleration zone can be secured.

That is, when the forward vehicle is sensed through the forward sensing operation of the front camera 112 or the front radar 114, the collision avoidance processing unit 130 determines whether the forward acceleration zone can be secured, using a distance from the forward vehicle and the speed of the forward vehicle. When the forward acceleration zone can be secured, the collision avoidance processing unit 130 controls the ego vehicle to move to the forward acceleration zone, such that the ego vehicle exits from the dangerous situation. At this time, when no forward vehicle is present, the collision avoidance processing unit 130 may determine that the forward acceleration zone can be secured. Furthermore, when the distance between the ego vehicle and the forward vehicle is equal to or more than a predetermined distance, the collision avoidance processing unit 130 may determine that the forward acceleration zone can be secured. The predetermined distance may be set in consideration of the size and speed of the ego vehicle, the speed of the forward vehicle and the like.

As such, when the forward acceleration zone can be secured through the forward sensing operation in case of a risk of collision with a rearward vehicle, the collision avoidance processing unit 130 may perform the forward acceleration control function for controlling the ego vehicle to exit from a dangerous situation. At this time, the collision avoidance processing unit 130 may decide the speed of the ego vehicle for the forward acceleration control function, by considering the speed of the ego vehicle, the speed of the forward vehicle, the acceleration/deceleration of the ego vehicle, the acceleration/deceleration of the forward vehicle, the distance between the ego vehicle and the forward vehicle and the like.

When the forward acceleration zone cannot be secured, the collision avoidance processing unit 130 determines whether the ego vehicle can change lanes, based on information on a side vehicle which is traveling on the left or right lane of the ego vehicle. When the ego vehicle can change lanes, the collision avoidance processing unit 130 performs the lane change control function for controlling the ego vehicle to move to the lane change zone. The lane change zone may have a variable size based on the TTC. For example, when the TTC is increased, the ego vehicle does not need to urgently change lanes. Thus, the lane change zone may be set to a small size. On the other hand, when the TTC is decreased, the ego vehicle needs to urgently change lanes. Thus, the lane change zone may be set to a large size.

That is, when the forward acceleration zone cannot be secured because a forward vehicle is present on the lane where the ego vehicle is traveling, the collision avoidance processing unit 130 sets the lane change zone based on the TTC. Furthermore, when a side vehicle traveling on the left or right lane of the ego vehicle is sensed through the rear/side radar, the collision avoidance processing unit 130 determines whether the lane change zone can be secured, using the distance from the side vehicle and the speed of the side vehicle. When the determination result indicates that the lane change zone can be secured so that the ego vehicle can change lanes, the collision avoidance processing unit 130 performs the lane change control function for controlling the ego vehicle to move to the lane change zone. At this time, the collision avoidance processing unit 130 may decide the speed of the ego vehicle for the lane change control function, by considering the speed of the ego vehicle, the speed of the side vehicle, the acceleration/deceleration of the ego vehicle, the acceleration/deceleration of the side vehicle, the distance between the ego vehicle and the side vehicle and the like.

For example, when the forward acceleration zone Control1 Zone cannot be secured because the forward vehicle 2 is present on the lane of the ego vehicle, but the lane change zone Control2 Zone can be secured as illustrated in FIG. 5, the ego vehicle 1 can move to the lane change zone, and thus prevent a collision with the rearward vehicle 4.

As such, when the collision likelihood is high even in case of emergency braking, the collision avoidance processing unit 130 may perform steering control using the space of the monitored left or right lane, and thus control the ego vehicle to exit from a dangerous situation.

When a collision between the ego vehicle and the rearward vehicle cannot be avoided, the collision avoidance processing unit 130 may calculate a rearward impact amount between the ego vehicle and the rearward vehicle and a forward impact amount between the ego vehicle and the forward vehicle, decide the speed of the ego vehicle, at which any one of the rearward impact amount and the forward impact amount is minimized, and control the ego vehicle.

That is, the collision avoidance processing unit 130 calculates the amount of impact with the rearward vehicle and the amount of impact with the forward vehicle, when the ego vehicle is likely to collide with the rearward because a collision cannot be avoided. At this time, the collision avoidance processing unit 130 may calculate the relative speed and relative distance between the ego vehicle and the rearward vehicle, based on the speed of the rearward vehicle, the distance from the rearward vehicle and the speed of the ego vehicle, and calculate the rearward impact amount using the calculated relative speed and relative distance between the ego vehicle and the rearward vehicle and the speed of the ego vehicle. Furthermore, the collision avoidance processing unit 130 may calculate the relative speed and relative distance between the ego vehicle and the forward vehicle, based on the speed of the forward vehicle, the distance from the forward vehicle and the speed of the ego vehicle, and calculate the forward impact amount using the calculated relative speed and relative distance between the ego vehicle and the forward vehicle and the speed of the ego vehicle.

Then, the collision avoidance processing unit 130 decides the speed of the ego vehicle according to the smaller impact amount between the rearward impact amount and the forward impact amount, and performs a speed control function for controlling the ego vehicle to travels at the decided speed. At this time, the collision avoidance processing unit 130 decides the speed of the ego vehicle, at which the impact amount is minimized, by reflecting the relative deceleration of the forward vehicle, the deceleration information of the ego vehicle, the relative deceleration of the rearward vehicle and the like, and then performs the speed control function.

The collision likelihood determination unit 120 and the collision avoidance processing unit 130 may be implemented as processors which are required to execute a program on a computing device. As such, the collision likelihood determination unit 120 and the collision avoidance processing unit 130 may be implemented as physically independent components, and implemented as components which are functionally distinguished from each other in one processor.

The control unit 140 may serve to control the operations of the various components of the collision avoidance control apparatus 100 including the sensor unit 110, the collision likelihood determination unit 120 and the collision avoidance processing unit 130, and include one or more processing units. Examples of the processing units may include a general-purpose CPU and a programmable device (CPLD (Complex Programmable Logic Device) or FPGA (Field Programmable Gate Array)), an ASIC (Application Specific Integrated Circuit) and a micro controller chip, which are implemented for a specific purpose.

Figure 6:
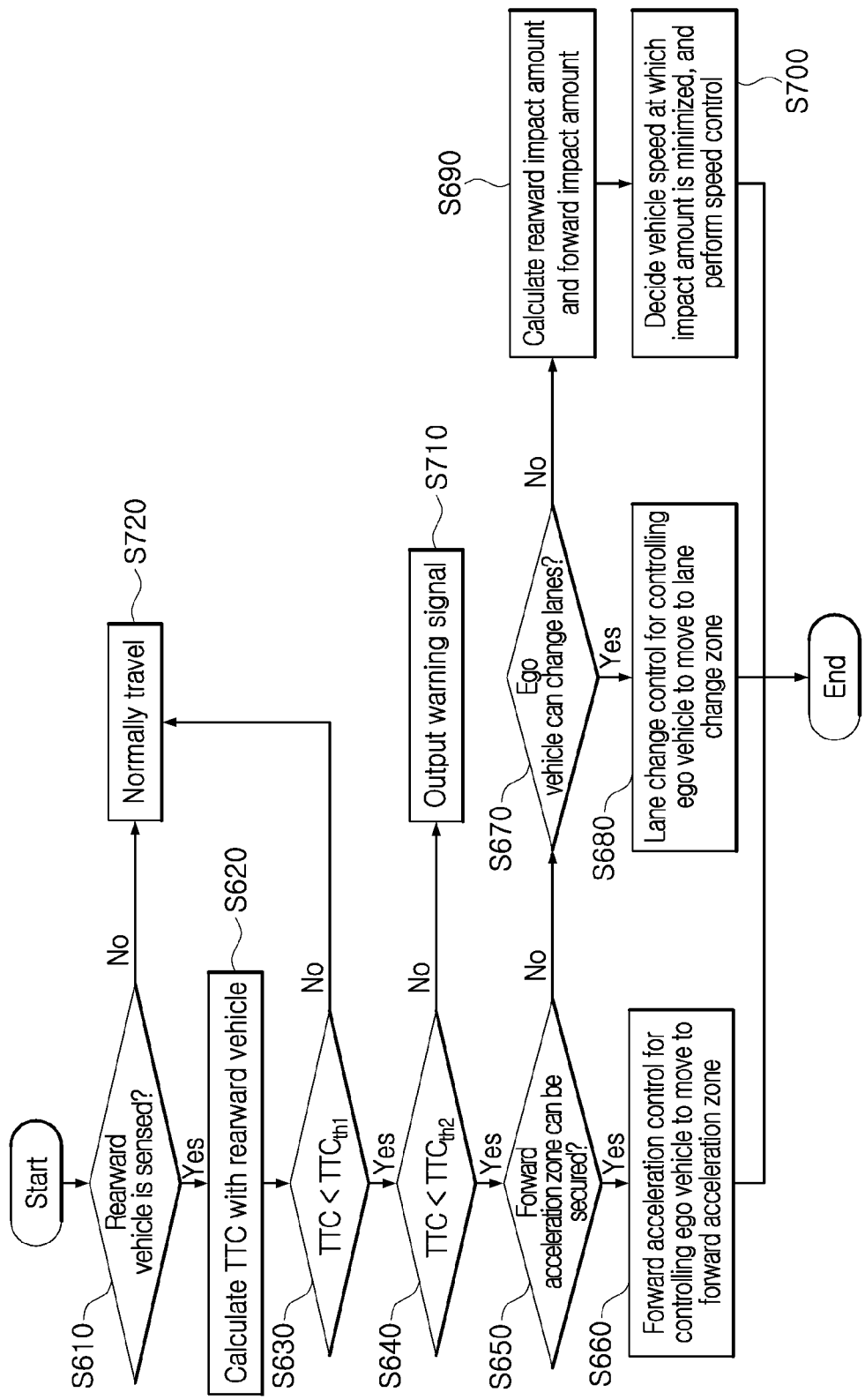
FIG. 6 is a flowchart for describing a collision avoidance control method for a vehicle in accordance with an exemplary embodiment of the present invention.

FIG. 6 is a flowchart for describing a collision avoidance control method for a vehicle in accordance with an embodiment of the present disclosure.

Referring to FIG. 6, the collision avoidance control apparatus determines whether a rearward vehicle approaching the rear of an ego vehicle is sensed, in step S610. That is, the collision avoidance control apparatus senses a forward situation, a rearward situation and a lateral situation of the ego vehicle, using cameras and radars installed in the ego vehicle, and determines whether the rearward vehicle is sensed.

When the determination result of step S610 indicates that the rearward vehicle is sensed, the collision avoidance control apparatus calculates a TTC between the ego vehicle and the rearward vehicle in step S620. At this time, the collision avoidance control apparatus may calculate the TTC based on a distance between the ego vehicle and the rearward vehicle and a speed difference between the ego vehicle and the rearward vehicle.

When step S620 is performed, the collision avoidance control apparatus determines whether the TTC is less than a first reference TTC $TTC_{th1}$ for determining a warning zone, in step S630.

When the determination result of step S630 indicates that the TTC is less than the first reference TTC, the collision avoidance control apparatus determines whether the TTC is less than a second reference TTC $TTC_{th2}$ for determining a control zone, in step S640.

When the determination result of step S640 indicates that the TTC is less than the second reference TTC, the collision avoidance control apparatus determines that the ego vehicle and the rearward vehicle are likely to collide with each other, and determines whether a forward acceleration zone can be secured, based on information on a forward vehicle which is traveling ahead of the ego vehicle, in step S650. At this time, when a forward vehicle is sensed through the forward sensing operation of the forward camera or the forward radar, the collision avoidance control apparatus may determine whether the forward acceleration zone can be secured, using the distance from the forward vehicle and the speed of the forward vehicle.

When the determination result of step S650 indicates that the forward acceleration zone can be secured, the collision avoidance control apparatus performs a forward acceleration control function for controlling the ego vehicle to move to the forward acceleration zone, in step S660. At this time, the collision avoidance control apparatus may decide the speed of the ego vehicle for the forward acceleration control function, by considering the speed of the ego vehicle, the speed of the forward vehicle, the acceleration/deceleration of the ego vehicle, the acceleration/deceleration of the forward vehicle, the distance between the ego vehicle and the forward vehicle and the like, and control the ego vehicle to travel at the decided speed.

When the determination result of step S660 indicates that the forward acceleration zone cannot be secured, the collision avoidance control apparatus determines whether the ego vehicle can change lanes, based on information on a side vehicle which is traveling on the left or right lane of the vehicle, in step S670. At this time, the collision avoidance control apparatus may set a lane change zone based on the TTC, determine whether a side vehicle is present on the left or right lane through the rear/side radars, and determine whether the lane change zone can be secured, using the distance from the side vehicle and the speed of the side vehicle, when the side vehicle is present.

When the determination result of step S670 indicates that the ego vehicle can change lanes, the collision avoidance control apparatus performs a lane change control function for controlling the ego vehicle to move to the lane change zone, in step S680. At this time, the collision avoidance control apparatus may decide the speed of the ego vehicle for the lane change control function, by considering the speed of the ego vehicle, the speed of the side vehicle, the acceleration/deceleration of the ego vehicle, the acceleration/deceleration of the side vehicle, the distance between the ego vehicle and the side vehicle and the like, and control the ego vehicle to change lanes at the decided speed.

When the determination result of step S680 indicates that the ego vehicle cannot change lanes, the collision avoidance control apparatus calculates a rearward impact amount between the ego vehicle and the rearward vehicle and a forward impact amount between the ego vehicle and the forward vehicle in step S690, and decides the vehicle speed at which any one of the calculated rearward impact amount and the calculated forward impact amount is minimized, and controls the ego vehicle to travel at the decided speed, in step S700.

When the determination result of step S610 indicates that no rearward vehicle is sensed, the collision avoidance control apparatus controls the ego vehicle to normally travel, in step S720.

When the determination result of step S630 indicates that the TTC is not less than the first reference TTC, the collision avoidance control apparatus does not output a warning signal, but controls the ego vehicle to normally travel, because the collision likelihood is low even though the rearward vehicle was sensed, in step S720.

When the determination result of step S640 indicates that the TTC is not less than the second reference TTC, the collision avoidance control apparatus outputs a collision risk warning signal, and informs a driver of the dangerous situation, in step S710.

As described above, the collision avoidance control method and apparatus for a vehicle in accordance with the embodiments of the present disclosure may perform the collision avoidance function such as the warning signal output function, the forward acceleration control function or the lane change control function, when the ego vehicle is likely to collide with the rearward vehicle approaching the rear of the ego vehicle, thereby preventing a rear end collision accident caused by emergency braking.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A collision avoidance control method for a vehicle, in which a collision avoidance control apparatus controls a vehicle to avoid a collision, the collision avoidance control method comprising:
   calculating a TTC (Time To Collision) between the vehicle and a rearward vehicle in response to sensing an approach of the rearward vehicle to the rear of the vehicle;
   determining a likelihood of collision between the vehicle and the rearward vehicle by comparing the TTC to a preset reference TTC; and
   performing a collision avoidance function when it is determined that the vehicle and the rearward vehicle are likely to collide with each other, the collision avoidance function including at least one of a collision risk warning signal output function, a forward acceleration control function, and a lane change control function,
   wherein:
   the performing of the collision avoidance function comprises:
      determining whether a forward acceleration zone is securable based on information on a forward vehicle which is traveling ahead of the vehicle;
      performing the forward acceleration control function for controlling the vehicle to move to the forward acceleration zone when the forward acceleration zone is secured, and determining whether a lane change zone is securable based on the TTC and information on a side vehicle which is traveling on a left or right lane of the vehicle when the forward acceleration zone is not securable; and
      performing the lane change control function for controlling the vehicle to move to the lane change zone when the lane change zone is securable; and
   the lane change zone has a variable size which is set based on the TTC.

2. The collision avoidance control method of claim 1, wherein the TTC is calculated based on a distance between the vehicle and the rearward vehicle and a speed difference between the vehicle and the rearward vehicle.

3. The collision avoidance control method of claim 1, wherein:
   the TTC comprises a first reference TTC for determining whether to output a collision risk warning signal and a second reference TTC for determining whether to perform the collision avoidance control function; and
   the determining of whether the vehicle and the rearward vehicle are likely to collide with each other comprises:
   determining whether the TTC is less than the first reference TTC;
   controlling the vehicle to travel normally when the TTC is not less than the first reference TTC, and determining whether the TTC is less than the second reference TTC, when the TTC is less than the first reference TTC; and
   outputting a warning risk warning signal when the TTC is not less than the second reference TTC, and determining that the vehicle and the rearward vehicle are likely to collide with each other when the TTC is less than the second reference TTC.

4. A collision avoidance control method for a vehicle, in which a collision avoidance control apparatus controls a vehicle to avoid a collision, the collision avoidance control method comprising:
   calculating a TTC (Time To Collision) between the vehicle and a rearward vehicle in response to sensing an approach of the rearward vehicle to the rear of the vehicle;
   determining a likelihood of collision between the vehicle and the rearward vehicle by comparing the TTC to a preset reference TTC; and
   performing a collision avoidance function when it is determined that the vehicle and the rearward vehicle are likely to collide with each other, the collision avoidance function including at least one of a collision risk warning signal output function, a forward acceleration control function, and a lane change control function,
   wherein:
   the performing of the collision avoidance function comprises:

determining whether a forward acceleration zone is securable based on information on a forward vehicle which is traveling ahead of the vehicle;

performing the forward acceleration control function for controlling the vehicle to move to the forward acceleration zone when the forward acceleration zone is secured, and determining whether a lane change zone is securable based on the TTC and information on a side vehicle which is traveling on a left or right lane of the vehicle when the forward acceleration zone is not securable; and performing the lane change control function for controlling the vehicle to move to the lane change zone when the lane change zone is securable; and the collision avoidance control method further comprising calculating a rearward impact amount with the rearward vehicle and a forward impact amount with the forward vehicle when the lane change zone is not securable, and deciding the speed of the vehicle at which any one of the rearward impact amount and the forward impact amount is minimized, and controlling the vehicle to travel at the decided speed.

5. The collision avoidance control method of claim 4, wherein the TTC is calculated based on a distance between the vehicle and the rearward vehicle and a speed difference between the vehicle and the rearward vehicle.

6. The collision avoidance control method of claim 4, wherein:

the TTC comprises a first reference TTC for determining whether to output a collision risk warning signal and a second reference TTC for determining whether to perform the collision avoidance control function; and the determining of whether the vehicle and the rearward vehicle are likely to collide with each other comprises:

determining whether the TTC is less than the first reference TTC;

controlling the vehicle to travel normally when the TTC is not less than the first reference TTC, and determining whether the TTC is less than the second reference TTC, when the TTC is less than the first reference TTC; and outputting a warning risk warning signal when the TTC is not less than the second reference TTC, and determining that the vehicle and the rearward vehicle are likely to collide with each other when the TTC is less than the second reference TTC.

7. A collision avoidance control apparatus for a vehicle, comprising:

a sensor unit configured to sense approach of a rearward vehicle to the rear of a vehicle;

a collision likelihood determination unit configured to:
calculate a TTC between the vehicle and the rearward vehicle in response to sensing the approach of the rearward vehicle through the sensor unit;
compare the TTC to a preset reference TTC; and
determine a likelihood of collision between the vehicle and the rearward vehicle based on the comparison result of the TTC to the preset reference TTC; and a collision avoidance processing unit configured to perform a collision avoidance function when it is determined that the vehicle and the rearward vehicle are likely to collide with each other, the collision avoidance function including one or more of a collision risk warning signal output function, a forward acceleration control function and a lane change control function, wherein:

the collision avoidance processing unit performs the lane change control function for controlling the vehicle to move to a lane change zone when the lane change zone is securable based on the TTC and information on a side vehicle which is traveling on a left or right lane of the vehicle; and the lane change zone has a variable size which is set based on the TTC.

8. The collision avoidance control apparatus of claim 7, wherein the collision likelihood determination unit calculates the TTC based on a distance between the vehicle and the rearward vehicle and a speed difference between the vehicle and the rearward vehicle.

9. The collision avoidance control apparatus of claim 7, wherein:

the TTC comprises a first reference TTC for determining whether to output a collision risk warning signal and a second reference TTC for determining whether to perform the collision avoidance control function; and the collision likelihood determination unit compares the TTC to the first reference TTC, controls the vehicle to travel normally when the TTC is not less than the first reference TTC, compares the TTC to the second reference TTC when the TTC is less than the first reference TTC, outputs a collision risk warning signal when the determination result indicates that the TTC is not less than the second reference TTC, and determines that the vehicle and the rearward vehicle are likely to collide with each other, when the determination result indicates the TTC is less than the second reference TTC.

10. A collision avoidance control apparatus for a vehicle, comprising:

a sensor unit configured to sense approach of a rearward vehicle to the rear of a vehicle;

a collision likelihood determination unit configured to:
calculate a TTC between the vehicle and the rearward vehicle in response to sensing the approach of the rearward vehicle through the sensor unit;
compare the TTC to a preset reference TTC; and
determine a likelihood of collision between the vehicle and the rearward vehicle based on the comparison result of the TTC to the preset reference TTC;

a collision avoidance processing unit configured to perform a collision avoidance function when it is determined that the vehicle and the rearward vehicle are likely to collide with each other, the collision avoidance function including one or more of a collision risk warning signal output function, a forward acceleration control function and a lane change control function, wherein:

the collision avoidance processing unit performs the forward acceleration control function for controlling the vehicle to move to a forward acceleration zone when the forward acceleration zone is securable based on information on a forward vehicle which is traveling ahead of the vehicle; and the collision avoidance processing unit calculates a rearward impact amount with the rearward vehicle and a forward impact amount with the forward vehicle when the vehicle cannot avoid a collision with the rearward vehicle, and decides the speed of the vehicle, at which any one of the rearward impact amount and the forward impact amount is minimized, and controls the vehicle to travel at the decided speed.

11. The collision avoidance control apparatus of claim 10, wherein the collision likelihood determination unit calculates the TTC based on a distance between the vehicle and the rearward vehicle and a speed difference between the vehicle and the rearward vehicle.

12. The collision avoidance control apparatus of claim 10, wherein:
the TTC comprises a first reference TTC for determining whether to output a collision risk warning signal and a second reference TTC for determining whether to perform the collision avoidance control function; and
the collision likelihood determination unit compares the TTC to the first reference TTC, controls the vehicle to travel normally when the TTC is not less than the first reference TTC, compares the TTC to the second reference TTC when the TTC is less than the first reference TTC, outputs a collision risk warning signal when the determination result indicates that the TTC is not less than the second reference TTC, and determines that the vehicle and the rearward vehicle are likely to collide with each other, when the determination result indicates the TTC is less than the second reference TTC.

* * * * *